United States Patent
Brogan et al.

(10) Patent No.: US 12,100,962 B2
(45) Date of Patent: Sep. 24, 2024

(54) BLACK START OF A WIND FARM BY RAMPING UP A CONVERTER VOLTAGE REFERENCE

(71) Applicant: Siemens Gamesa Renewable Energy A/S, Brande (DK)

(72) Inventors: Paul Brian Brogan, Glasgow (GB); Douglas Elliott, Glasgow (GB); Thyge Knueppel, Værløse (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 311 days.

(21) Appl. No.: 17/612,648

(22) PCT Filed: Apr. 24, 2020

(86) PCT No.: PCT/EP2020/061529
§ 371 (c)(1),
(2) Date: Nov. 19, 2021

(87) PCT Pub. No.: WO2021/004667
PCT Pub. Date: Jan. 14, 2021

(65) Prior Publication Data
US 2022/0231510 A1  Jul. 21, 2022

(30) Foreign Application Priority Data
Jul. 5, 2019  (EP) .................................... 19184598

(51) Int. Cl.
*H02J 3/38* (2006.01)
*H02J 3/46* (2006.01)

(52) U.S. Cl.
CPC .............. *H02J 3/381* (2013.01); *H02J 3/388* (2020.01); *H02J 3/46* (2013.01); *H02J 2300/28* (2020.01)

(58) Field of Classification Search
CPC ...................................................... H02J 3/381
See application file for complete search history.

(56) References Cited

U.S. PATENT DOCUMENTS 9,831,678 B2   11/2017  Premm et al.
11,462,914 B2 * 10/2022  Sørensen ................ F03D 7/026
(Continued)

FOREIGN PATENT DOCUMENTS

CN   111742139 A  * 10/2020 ............. F03D 7/026
DE   102016105662 A1   10/2017
(Continued)

OTHER PUBLICATIONS

PCT International Search Report & Written Opinion mailed Jul. 28, 2020 corresponding to PCT International Application No. PCT/EP2020/061529.
(Continued)

*Primary Examiner* — Suresh Suryawanshi
(74) *Attorney, Agent, or Firm* — Schmeiser, Olsen & Watts LLP

(57) ABSTRACT

Provided is a method of controlling at least one converter of at least one wind turbine connectable to a wind park grid of a wind park during black start or island mode of the wind park, the method including: ramping up a converter voltage reference unless a power related condition and/or a wind park grid frequency related condition or a converter current related condition is violated.

15 Claims, 3 Drawing Sheets

(56) References Cited

U.S. PATENT DOCUMENTS

Figure 1:
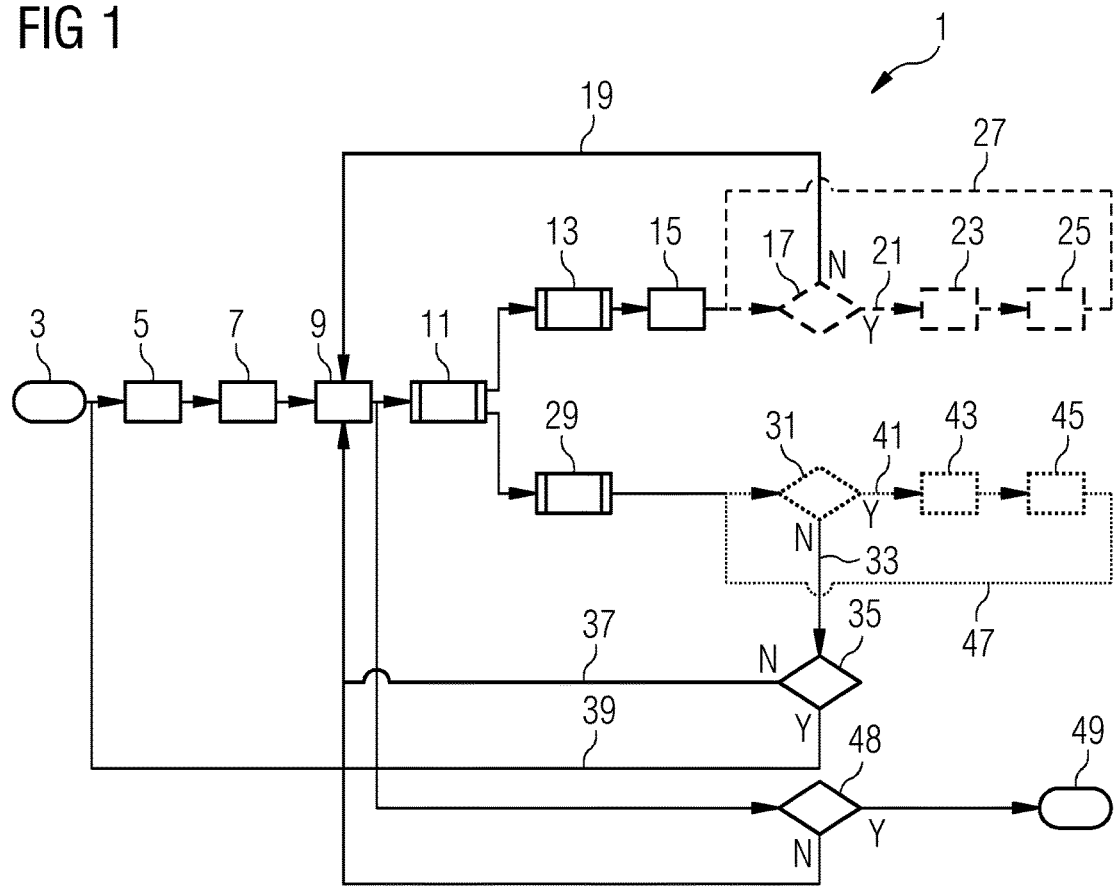

| | | | |
|---|---|---|---|
| 2008/0284172 A1* | 11/2008 | Nielsen | F03D 7/026 |
| | | | 290/44 |
| 2012/0261917 A1* | 10/2012 | Egedal | F03D 9/257 |
| | | | 290/44 |
| 2017/0214250 A1 | 7/2017 | Zietlow et al. | |
| 2018/0248378 A1 | 8/2018 | Ren | |
| 2019/0036344 A1* | 1/2019 | Beekmann | F03D 9/257 |
| 2020/0287410 A1 | 9/2020 | Zhao et al. | |
| 2021/0328429 A1* | 10/2021 | Brombach | H02J 3/50 |
| 2021/0388814 A1* | 12/2021 | Brombach | F03D 7/048 |

FOREIGN PATENT DOCUMENTS

| | | | |
|---|---|---|---|
| DE | 102017106338 A1 * | 9/2018 | F03D 9/257 |
| EP | 3116085 A1 | 1/2017 | |
| EP | 3533996 A1 | 9/2018 | |
| WO | 2012139667 A1 | 10/2012 | |
| WO | WO-2015149619 A1 * | 10/2015 | H02J 3/32 |
| WO | 2019127969 A1 | 7/2019 | |

OTHER PUBLICATIONS

European Search Report for Application No. 19184598.1, dated Nov. 25, 2019.

* cited by examiner

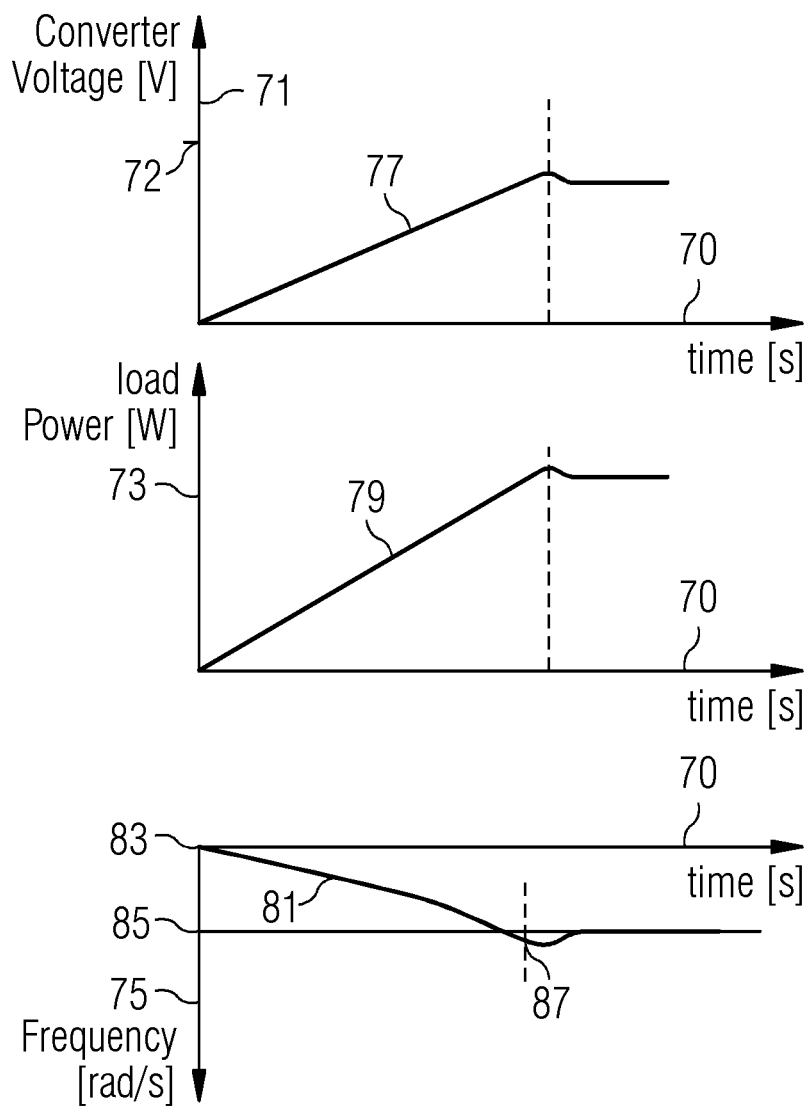
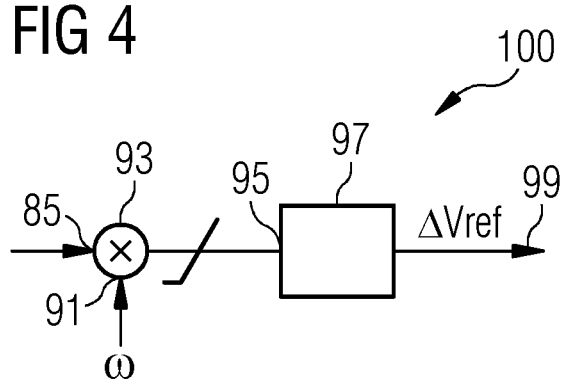

BLACK START OF A WIND FARM BY RAMPING UP A CONVERTER VOLTAGE REFERENCE

CROSS-REFERENCE TO RELATED APPLICATIONS

This application claims priority to PCT Application No. PCT/EP2020/061529, having a filing date of Apr. 24, 2020, which is based off of EP Application No. 19184598.1, having a filing date of Jul. 5, 2019, the entire contents both of which are hereby incorporated by reference.

FIELD OF TECHNOLOGY

The following relates to a method of controlling at least one converter of at least one wind turbine connected to a wind park grid of a wind park during black start of the wind park, relates to a corresponding arrangement and further relates to a wind park comprising plural wind turbines, wherein at least one wind turbine comprises the arrangement which is adapted to control or carry out the control method during black start.

BACKGROUND

EP 3 116 085 A1 discloses a method of operating a wind turbine connected to a utility grid via an umbilical AC cable through a network bridge controller with power and voltage control.

WO 2012/139667 A1 discloses a wind turbine device having in one embodiment a diesel generator to initialize a black start in case of a blackout of an electricity network to which the wind turbine device is couplable. For performing the black start, the diesel generator provides a predetermined voltage to a power output of the wind turbine device.

Black start relates to the start of a wind park, while the wind park is disconnected from the utility grid. Thus, during black start, no power which is supplied from the utility grid can be utilized for starting the one or more wind turbines of the wind park.

The conventional methods of performing a black start involve large thermal power stations; wind farms do not presently perform this role as the power converters that form the grid interface of the wind turbines require a stable voltage and frequency to operate. In future the availability and reliability of conventional thermal power stations will be limited and therefore there may be the need for wind farms to possess the capability to black start themselves.

Thus, there may be a need for a method of controlling at least one converter of at least one wind turbine connected (or connectable) to a wind park grid of a wind park during black start, there may be a need for a corresponding arrangement and there may be a need for a wind park having the capability of performing the black start.

SUMMARY

Embodiments of the present invention cover or acknowledge the limitation of active power, frequency and current of a power converter, with a grid-forming control algorithm, when it is being used to either black start its local busbar, its local electrical string cable, a larger network such as the whole electrical network of a wind farm and/or a predetermined section of the grid, which is initially in a de-energized state.

According to an embodiment of the present invention it is provided a method of controlling at least one converter of at least one wind turbine connectable (or connected) to a wind park grid of a wind park during black start or island mode of the wind park (in particular being disconnected from a utility grid), the method comprising: ramping up a converter voltage reference unless a power related condition and/or a wind park grid frequency related condition or a converter current related condition is violated.

The converter may be coupled to a generator which is driven by a rotation shaft at which plural rotor blades are mounted. The converter may for example comprise or be a AC-DC, DC-AC converter. In particular, the converter may comprise a generator side portion, in particular an AC-DC converter portion, a DC link and a utility grid side converter portion, for example a DC-AC converter portion. In particular, the utility grid converter portion may be controlled according to embodiments of the present invention, in particular without controlling also the generator side converter portion.

During normal operation, when the wind park or the wind turbine is producing energy, the utility grid converter portion may be connected, for example via a point of common coupling and via one or more transformer, to a utility grid which provides power to plural consumers. In particular, each converter of each wind turbine of the wind park may be controlled according to the control method of embodiments of the present invention. While performing the method, the wind turbine and in particular the entire wind park may be disconnected from the utility grid. The converter may be supplied with control signals including the converter voltage reference, the converter power reference, in particular converter active power reference and others. Based on the control signals to the converter, pulse width modulation signals may be derived which may be supplied to gates of controllable switches (such as IGBTs) which are comprised within the converter.

During the black start process the network bridge of the converter can ramp the voltage at its terminals from zero volts up to the nominal voltage, and thus energise the AC electrical system external to the wind turbine generator (WTG). Depending on the electrical network configuration to which it is connected, the ramp-up of the voltage at the converter terminals may result in the increase of the voltage in the electrical network and therefore the energization of any passive loads on this external AC network. Passive loads could be the capacitance of the cables, inductances of transformers and/or resistive power losses for example.

The power converter performing the voltage ramp has to balance both the active and reactive power loads of the electrical system whilst respecting the finite limits to the amount of active power it can provide to the electrical network, the maximum allowable frequency deviation from a target frequency it can allow and a current limit of the power converter.

In order to respect these limits, the network bridge controller (e.g., performing the control method) of the power converter may contain features that allow the (ideally) autonomous control of the voltage increase while taking into account all three sets of limits. That is, any WTG that is participating in the energization may support the load of the external AC electrical system to within its capability while not knowing the state of the remaining WTGs in the wind farm; and the local decision of any WTG to increase the level of voltage must (or may) not cause the remaining participating WTGs to violate their limits on power, frequency and current.

Similarly, when the voltage has been increased to the nominal level by the converter it must continue to ensure the frequency, active power and current limits are respected. When the converter is in this state it is described as operating in island mode; this indicates that the external AC electrical network being supported by the converter(s) is not connected to a larger electrical grid and the converters therefore have to take the necessary actions to support the grid on their own and balance the active and reactive load.

Embodiments of the present invention disclose details of the design of the features that allow the various limits of the converter(s) to be respected either during a black start voltage ramp or when operating in island mode. Thus, embodiments of the control method may be applied during black start or during an island mode, in which the entire wind park is disconnected from the utility grid.

The wind park grid may be an electrical network via which the plural wind turbines are connected with each other, in particular at their power output terminals. By respective breakers or switches, each individual wind turbine may be disconnected from the wind park grid or may be connected to it. Similarly, by a respective breaker or switch the wind park grid may be disconnected from the utility grid or may be connected to it. In particular, while performing the control method, at the very beginning, when the wind park grid voltage is unequal from (e.g., lower than) the utility grid voltage, the wind park grid may be disconnected from the utility grid. When the wind park voltage substantially equals (or is larger than) the utility grid voltage, the respective wind park may be connected to the utility grid.

While performing the black start, the wind turbines involved will be connected to the wind park grid and work together to increase the wind park grid voltage to a target voltage which may be close to or greater than the utility grid voltage.

The ramping up the converter voltage reference may also be restricted such that the converter voltage reference is not exceeding a target wind park grid voltage. When the power related condition and/or the wind park grid frequency related condition or a converter current related condition is respected, the converter may be protected from damage and further, desired frequency of the wind park grid may be achieved.

Embodiments of the present invention may require for the wind turbines during the black start, to limit their active power, frequency and/or current during the energization (black start) of the wind park grid. Thereby, a black start may be performed in a more reliable manner and in particular in a fast manner without the risk of damaging components of the wind turbines, in particular converters.

The power related condition may include a consideration of the converter power reference and an available power. The wind park grid frequency related condition may consider wind park grid upper and lower limit frequencies and the actual wind park grid frequency. The converter current related condition may respect or consider a converter current limit compared to the actual converter current.

According to an embodiment of the present invention, ramping up the converter voltage reference comprises: measuring a wind park grid voltage; supplying to the converter as a converter voltage reference a sum of the wind park grid voltage and a positive increment;

increasing a converter power reference when a wind park grid frequency falls below a target wind park grid frequency (e.g. due to imbalance of converter power reference and active power load); continuing increasing the converter voltage reference up to a target value of the wind park grid voltage unless: the converter power reference is greater than an available converter (active) power and/or a converter current is greater than a converter current limit.

Ramping up the converter voltage reference may be performed with a predetermined rate. The ramping up may be performed in steps, such that (repetitively) a positive increment is added to the previous converter voltage reference. The wind park grid voltage may relate to the voltage of the wind park grid, i.e., the electrical network connecting the plural wind turbines of the wind park. The positive increment may be defined by a desired ramp rate of the converter voltage reference. After supplying the converter voltage reference to the converter, the converter may control its respective controllable switches such as to actually output the desired modulation voltage at its terminals. At this stage, the converter of the respective wind turbine may already be connected to the wind park grid.

The wind park comprises also energy consumers, such as other wind turbines which have not been started up yet or other auxiliary equipment requiring electric energy for operation. For a stable black start, there has to be an approximate balance of produced power and consumed power.

The nominal wind park grid frequency may be the frequency which is desired to be finally achieved before connecting the entire wind park to the utility grid. The nominal wind park grid frequency may substantially be equal to a nominal utility grid frequency. If the converter power reference is not greater than the available converter power or when the converter current is not greater than a converter current limit increasing the converter voltage reference may be continued.

The target value of the wind park grid voltage may also be referred to as a nominal wind park grid voltage, i.e., a desired voltage of the wind park grid. By the method, the wind park grid voltage may continuously or in a stepwise manner be increased while respecting power balance and respecting current limits of the converter. Furthermore, the frequency may be restricted to not deviate from the target frequency more than a maximal deviation by keeping the wind park grid frequency close to the wind park grid frequency limit.

According to an embodiment of the present invention, the available converter power is based on an available power of a generator driven by a rotation shaft at which plural rotor blades are connected. The available converter power may for example equal to the available power of the generator diminished by losses.

According to an embodiment of the present invention, the method further comprises, if the converter power reference is greater than the available converter (e.g. active) power: discontinuing further increasing the converter voltage reference; using trim control to hold the wind park grid frequency at a wind park grid frequency limit.

By this feature it may be ensured that the wind park grid frequency does not deviate too much from the target wind park grid frequency.

According to an embodiment of the present invention, using trim control comprises: changing, in particular decreasing, the converter voltage reference depending on a frequency difference between the wind park grid frequency and the wind park grid frequency limit, in order to prevent the wind park grid frequency from further decreasing, in particular in order to hold the wind park grid frequency close the wind park grid frequency limit.

Thus, instead of further increasing the converter voltage reference, the converter voltage reference is changed depending on a frequency difference between the wind park grid frequency and the wind park grid frequency limit. Thus, the wind park grid frequency may be kept in a predictable range.

According to an embodiment of the present invention, the method further comprises if the converter current is greater than the converter current limit: discontinuing further increasing the converter voltage reference; using reactive current limit control to hold the converter current at the converter current limit. By applying the reactive current limit control, the converter may be protected from damage.

According to an embodiment of the present invention, using reactive current limit control comprises: changing, in particular decreasing, a converter modulation voltage limit depending on a difference between the reactive converter current limit and the reactive converter current, in particular in order to keep the converter current at the converter current limit. Thereby, a reliable procedure for keeping the converter current at the converter current limit may be provided. Whereby the converter modulation voltage is the voltage that is produced at its terminals by the switch action of the converter, and the converter modulation voltage limit is the limitation of this voltage to prevent the converter current exceeding the current limit.

According to an embodiment of the present invention, the reactive current limit control selects whether to limit an upper or a lower converter modulation voltage limit depending on whether the reactive converter current is inductive or capacitive.

Either the upper or the lower modulation voltage limit may be used to limit the converter current depending on whether the converter is supplying capacitive reactive current or absorbing inductive reactive current respectively.

According to an embodiment of the present invention, the wind park frequency limit is given as a difference between a nominal frequency and a maximal frequency deviation. Thus, it may be ensured that the wind park grid frequency does not unpredictably change.

According to an embodiment of the present invention, it is provided a method of controlling plural converters of plural wind turbine connected to a wind park grid of a wind park during black start of the wind park (e.g. being disconnected from a utility grid), the method comprising: performing, for each of the plural converters independently, a method according to one of the preceding embodiments.

Thus, the converters may be independently from each other controlled according to the control method as described above. Thus, in particular, no synchronization of controlling the converters may be required. Thereby, coordinating features for coordinating the control of the different converters may not be necessary, thereby simplifying the method.

According to an embodiment of the present invention it is provided an arrangement for controlling at least one converter of at least one wind turbine connectable to a wind park grid of a wind park during black start or island mode of the wind park (e.g. being disconnected from a utility grid), being adapted to control or carry out a method according to one of the preceding embodiments.

It should be understood, that features, individually or in any combination, disclosed, described, explained or provided for a method of controlling at least one converter of at least one wind turbine connected to a wind park grid of a wind park during black start or island mode may also be applied, individually or in any combination to an arrangement for controlling at least one converter of at least one wind turbine connected to a wind park grid of a wind park during black start or island mode according to embodiments of the present invention and vice versa.

According to an embodiment, the arrangement may comprise an available active power clamp, adapted to ensure that the converter power reference is restricted by the available power.

The available active power clamp may for example include a frequency to reference power droop which outputs a change in reference power in dependence of deviation of the wind park grid frequency from the target frequency. The actual power output by the converter may be measured as a power feedback. The power feedback may be filtered and added to the reference power as output by the frequency to power reference droop.

According to an embodiment of the present invention, the arrangement further comprises a trim controller, adapted to control the wind park grid frequency to the wind park grid frequency limit, by changing the converter reference voltage.

The trim controller may comprise a difference element which derives the frequency error as a difference between the actual frequency of the wind park grid and the frequency limit and supplies the frequency error to a controller, such as a PI-controller. The PI-controller may output a change in the reference voltage.

According to an embodiment of the present invention, the arrangement further comprises a reactive current limit controller, adapted to control the converter reactive current to the converter current limit, by adjusting the converter modulation voltage limits.

Furthermore, it is provided a wind park comprising plural wind turbines connected within a wind park grid, wherein at least one wind turbine comprises an arrangement according to one of the four preceding claims.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiments but to which the invention is not limited.

BRIEF DESCRIPTION

Figure 2:
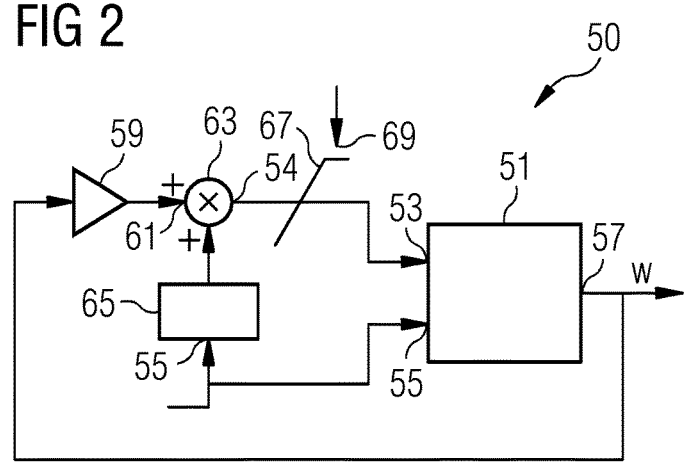
Figure 5:
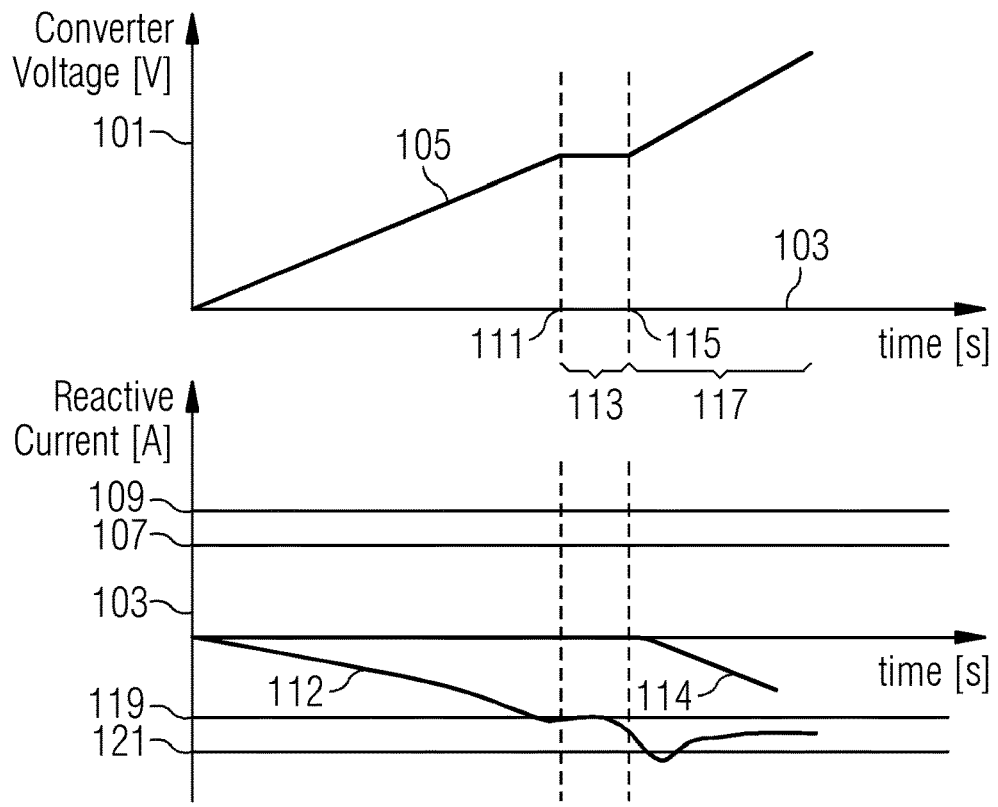
Figure 6:
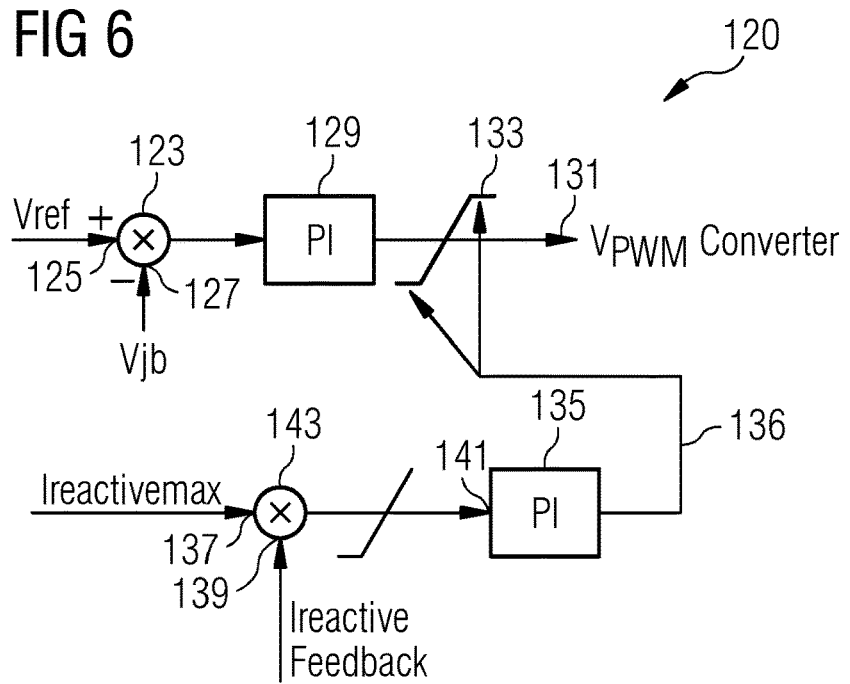

Some of the embodiments will be described in detail, with reference to the following figures, wherein like designations denote like members, wherein:

FIG. 1 schematically illustrates a method of controlling at least one converter according to an embodiment of the present invention;

FIG. 2 schematically illustrates a portion of an arrangement for controlling at least one converter, illustrating a droop control between the converter frequency and the converter power reference which is limited by an available active power clamp;

FIG. 3 illustrates the evolvement of different electrical parameters as obtained in embodiments of the present invention;

FIG. 4 schematically illustrates a portion of an arrangement for controlling at least one converter according to an embodiment of the present invention, including a trim controller;

FIG. 5 illustrates the evolvement of electrical parameters as obtained in embodiments of the present invention; and FIG. 6 illustrates a portion of an arrangement for controlling at least one converter according to an embodiment of the present invention with emphasis to a reactive current limit controller.

DETAILED DESCRIPTION

The method 1 schematically illustrated in FIG. 1 of controlling at least one converter of at least one wind turbine connectable to a wind park grid of a wind park during black start or island mode starts with the method step 3, wherein the converter black start is initiated. The precondition is thereby, that the wind turbine rotor of the wind turbine is spinning and that the generator is controlling the DC link voltage.

The method 1 in particular illustrates how to control the utility grid (wind park grid) side portion of the converter. At method step 5, the present wind park grid voltage is measured. At the method step 7, the voltage reference ramp is initialized to start from the measured wind park grid voltage. In the method step 9, a loop is entered, wherein the converter voltage reference is ramped up at a specified rate. As is indicated in the box 11, the active and reactive power loading of the converter rises in proportion with the converter voltage reference being increasing. As indicated in the block 13, also the wind park grid frequency changes in proportion to the controller power error Perr=Powerref−Pactiveload. In method step 15, the converter power reference is increased as the frequency falls according to a frequency to power reference droop as will be explained in further detail with reference to FIG. 2.

In the decision block 17 it is checked whether the converter power reference is greater than the available power. If this is not the case it is branched into the branching 19 leading back to the ramp loop step 9. Thus, the converter voltage reference is increased and the elements 11, 13, 15 are again executed. At some points, the converter power reference will be greater than the available power and it is branched from decision element 17 into the yes-branch 21.

The branch 21 leads to the method step 23 where the voltage ramp is frozen. In the next method step 25, trim control is used to hold the frequency on a wind park grid frequency limit. After the method step 25 it is looped back via a branch 27 to the decision element 17.

After increasing the converter voltage reference in method step 9 and after the active and reactive power loading of the converter rises in proportion with the voltage, also, according to the box 29, the converter current increases in proportion to the active and reactive load.

In the decision element 31 it is checked whether the converter current is greater than a converter current limit. If this is not the case it is branched into the branching 33 leading to a further decision element 35. In the decision element 35 it is checked whether the converter current just came out of the limit. If this is not the case, it is branched into the no-branch 37 leading back to the ramping loop 9.

If on the other hand the converter current has just came out of limit it is branched to the branch 39 leading back to the method step 5 where the present wind park grid voltage is measured.

If the decision element 31 determines that the converter current is greater than the converter current limit, the yes-branch 41 leads to the method step 43 in which the voltage ramp is frozen. As a next method step 45, the reactive current limit control is utilized to hold the converter current on the converter current limit. After the method step 45 it is looped back via the branch 47 to the decision element 31.

After having increased the converter voltage reference in the method step 9 it is also checked in the decision element 48, if the target voltage of the wind park grid has been reached. If this is the case, the black start process is complete, as indicated in method step 49 and the island mode is entered. Alternatively, the entire wind farm may be connected to the utility grid. If the decision element 48 determines that the target wind farm grid voltage has not been reached it is looped back to the ramp loop method step 9.

The diagram illustrated in FIG. 1 illustrates the sequence of method steps for each individual wind turbine converter. The start-up of the converter in each wind turbine is not intended to be coordinated but may be dependent on the wind speed for instance. In particular, each wind turbine may increase its voltage until either the frequency or the current limits are reached or indeed the target voltage level of the wind farm grid is reached. When the converter reaches either of the limits, the controller will be present in the appropriate loop until the decision can be made to exit the loop because the converter is no longer in the limit (see loops 27, 47). The mechanism by which the converter can transition from being "in limit" to be "not in limit" may be 1) if another wind turbine in the wind farm connects and starts to supply a portion of the overall load or 2) if the load (active or reactive) falls for some reason or 3) the wind speed increases for example.

It may be possible that a second or more wind turbines connect before the first turbine has reached either limit. In this case, all connected wind turbines may ramp the voltage together, circulating the loops 27, 45, 19 until either they hit a current or power limit or the target voltage. The target voltage may not always equal the nominal voltage of the wind park grid.

FIG. 2 schematically illustrates a portion 50 (active power clamp) of an arrangement for controlling at least one converter according to an embodiment of the present invention. A grid-forming control block 51 receives a converter power reference 53 and a power feedback 55. The grid-forming control 51 outputs a frequency 57 (ω). The frequency 57 is supplied to a frequency to power reference droop module 59 which outputs a deviation in power reference 61. The deviation of power reference 61 may be added, using an addition element 63 to a power feedback 55 which may either be filtered using a filter 65 or which may not be filtered. The addition of the power feedback is optional, it may not be always required. It may however result in less variation of the converter frequency providing cleaner behaviour.

The sum as obtained by the addition element 63 results in the final power reference 53 that the grid forming control acts to control power too. The final power reference 53 is the sum of output 61 and the output of filter 65 that has been limited by the limit 69 and is supplied to the grid forming controller 51. A limiter 67 receives the available power 69 to limit the output 54 of the addition element 63 to the available power 69 to result in the final power reference 53.

Limitation of active power and frequency may be achieved using an available power clamp as described below:

As the converter increases the voltage at its terminals it starts to feed active power into the electrical network to satisfy the passive loads. The design of a grid forming controller algorithm uses the error between the power feedback and the power reference to drive a frequency change and subsequent voltage vector angle shift to control the power output by the converter. As the active load increases on the converter the frequency can be controlled using a droop between the frequency error and the power reference. This droop functions by observing the frequency change caused by the increase in the active load and then proportionately increases the power reference of the converter to balance the power feedback. It therefore acts to stabilize the frequency (see FIG. 2) and provide an operating point for the converter. The gain of this droop is chosen so that for a given change of frequency a particular change in power reference is applied.

The operator of the power converter or the electrical network may place a limit on the maximum frequency deviation from the nominal value (usually dictated by international standards). Also, the amount of active power the converter can supply to the electrical network is limited by the amount of available power from its prime mover (the wind for example). The droop between frequency and power reference alone cannot prevent the either the available power limit or the frequency limit being breached and therefore it must be supplemented by two additional control features:

- Available active power clamp—When the available power limit (defined by the prevailing wind conditions, less losses) is reached, the increase of the controller power reference is clamped at the limit value. This has the effect of disengaging the droop between frequency and power reference, therefore allowing the frequency to increase or decrease in proportion to the load until the frequency hits its own limit.
- Voltage ramp freeze and trim controller—this controller detects when the frequency reaches the limit, and then freezes the ramp of the converter voltage and applies a proportional integral type control on the converter voltage to control the frequency to the limit value. By freezing the voltage ramp, the controller is preventing the further increase of the active load (assuming that the active power loads of the system are proportional to grid voltage, i.e. they are passive resistive loads). This slows the increase of the frequency deviation, allowing the trim controller to assume control of the converter voltage to regulate the active power load placed on the converter and bring the frequency back to the limit by changing the balance between the power reference and feedback (see FIG. 3).

An alternate implementation of the droop between frequency and power reference is to sum the measured power feedback (either unfiltered or filtered) with the output of the droop before it is clamped by the available power (see FIG. 2). This additional link allows the converter frequency to remain at or close to the nominal value until the available power limit is reached. At which point the frequency will deviate until it hits the Voltage ramp freeze and trim controller threshold, described above.

To allow the voltage of the electrical network to continue to ramp-up to the nominal level without violating the power and frequency limits of any one converter, additional black start capable converters connected in parallel are required so that the load can be shared. When multiple grid forming controlled converters are connected in parallel, the frequency of the electrical network is the common variable that allows the sharing of active power load. When the target voltage of the electrical network has been reached, the voltage ramp freeze and trim controller can no longer operate and the limitation of the frequency may be wholly dependent on their being sufficient available power from all of the connected converters to supply the load.

FIG. 3 illustrates several graphs regarding the converter voltage (ordinate 71), load power (ordinate 73) and frequency (ordinate 75) while the abscissas 70 indicate the time. According to the curve 77, the black start voltage is ramped by a constant rate. According to the curve 79, also the load power rises. At the same time, the frequency according to curve 81 decreases in particular below the target frequency 83 and hits a frequency limit 85 at a time point 87. At this instance, the ramping up the converter reference voltage is discontinued in order to keep the frequency 81 close to the frequency limit 85. 72 indicates a voltage target value.

FIG. 4 schematically illustrates a portion of an arrangement for controlling at least one converter with emphasis to a trim controller 100. The frequency limit 85 and the converter frequency 91 are subtracted from each other, wherein if the frequency 91 is smaller than zero, the frequency limit is added and the frequency 91 is subtracted. If the frequency 91 is larger than zero, the frequency limit is subtracted and the frequency 91 is added. The result of the difference element 93 is labelled with reference sign 95 and is supplied to a controller 97 which derives therefrom a change in a reference voltage (ΔVref), which is labelled with reference sign 99.

FIG. 5 illustrates graphs of electrical parameters as achieved in embodiments of the present invention. Thereby, the converter voltage (ordinate 101) and the reactive current (ordinate 103) are indicated in dependence of time (abscissas 103). According to the curve 105, the converter voltage rises according to the black start voltage ramp.

In the reactive current diagram, a first current limit 107 and a second current limit 109 are indicated.

Depending on whether the load on the wind park grid is inductive or capacitive the reactive current will be either positive or negative, respectively. When the load is inductive and the reactive current positive (not shown in FIG. 5, but it may be the case according to another embodiment), the limits 107 and 109 may be applied.

When the load is capacitive and the reactive current is negative (see current curve 112 in FIG. 5), the limits 119 and 121 may be applied.

Thus, for the case of positive reactive current there may be a first and a second current limit defined. Further, for the case of negative reactive current there may be another first and another second current limit defined.

Curve 112 indicates the reactive current of the first converter. Curve 114 indicates the reactive current of the second converter. At the point in time 111, the first converter hits its first converter current limit 119. As a result, further increasing the converter voltage reference is frozen or discontinued in the time interval 113. At the point in time 115, a second converter connects to the wind farm grid and continues the voltage ramp. In the time interval 117, reactive current control is active to continue limiting the current of the first converter 112. Thereby, a first current limit 119 associated with the first converter and a second current limit 121 also associated with the first converter are indicated. According to the reactive current control, the reactive current 112 of the first converter is controlled to be close to the second current limit 121.

FIG. 6 schematically illustrates a portion of an arrangement of controllers at least one converter with emphasis of reactive current limit control 120. Using a difference element 123, a difference between the voltage reference 125 and a voltage feedback signal 127 is calculated. The difference is supplied to a PI-controller 129 which outputs the converter modulation voltage demand 131. This converter output voltage 131 is subject to a limiter 133 which receives an upper limit and a lower limit 136 from another PI-controller 135. To the other PI-controller 135, a difference between a converter current limit 137 and a feedback converter current 139 is provided, wherein the difference 141 is calculated by a difference element 143. The difference element 143 calculates the difference between the signals 139 and 137, if the reactive current feedback 139 is larger than zero. The difference element 143 calculates the difference between the signals 137 and 139 if the reactive feedback current is smaller than zero. If the feedback reactive converter current is larger than zero, the upper limit is applied to the limiter 133. If the reactive feedback converter current is smaller than zero, then the lower limit of the limiter 133 is applied.

Limitation of reactive power/overall output current can be performed as described below:

As the converter ramps-up its voltage, it will also start to exchange reactive power with the electrical network to satisfy the reactive load of its components. The reactive load placed on the converter is also a function of the voltage in the electrical network and therefore will increase proportionally as the converter voltage is ramped up. The limiting factor within the converter to the amount of reactive load it can supply is the current limit which accounts for the conduction of active as well as reactive current components.

To ensure the converter current limit isn't violated by the reactive load placed on the converter, a calculation is performed giving the maximum capacity available for the reactive current flow (eqn (1)).

$$I_{ReactiveMax} = \sqrt{I_{ConverterRating}^2 - I_{Active}^2}$$

This calculation gives priority to active current and therefore once the active current is subtracted from the overall current limit the remaining current capacity is allocated to the reactive component. Once the reactive current limit is known it is used to drive the reactive current limit feature.

The reactive current limit feature may operate by controlling the voltage drop across the converter filter reactance. When performing a black start there may be effectively two levels of current limit:
1) The level at which the black start voltage ramp is frozen.
2) The actual 'hard' reactive current limit of the converter.

When the current has risen to the first limit (e.g., 119 or 107 in FIG. 5), the ramp of the converter voltage is frozen allowing reactive current load on the converter and the electrical network voltage to stabilize. This limit is chosen to be inside of the hard current limit of the converter so that there is some slack for the converter to balance the reactive load to stabilize the voltage. Once the voltage is frozen after hitting this limit the continuation of the black start voltage ramp towards its target can only be achieved by the addition of one or more parallel, black start capable, converters with which the first converter can share the load (see FIG. 5).

Once an additional converter has connected, it may start to ramp the electrical system voltage from the level where the first converter reached its current limit. When this ramp begins, it will cause the current of the first converter to increase beyond its first current limit until it reaches its second 'hard' current limit (e.g., 109 or 121 in FIG. 5), at which point the reactive current limit controller may be activated.

The reactive current limit controller may override the voltage controller of the grid forming algorithm and uses a proportional integral (PI) action to control the reactive current to the limit value by regulating the converter output voltage (see FIG. 6). The reactive current controller may select whether to limit the upper or lower converter voltage limit, depending on the direction of current flow (inductive or capacitive).

While the second converter continues to ramp up the electrical system voltage, the reactive current controller of the first converter may force its output voltage to follow the ramp so that its current remains on the limit. While the voltage ramp is continuing, the second converter will supply any change to the reactive current load of the electrical network; until it itself reaches its first current limit and freezes the voltage ramp or the target voltage of the ramp is reached.

Once the black start voltage ramp has increased the electrical system voltage to the target level (usually nominal voltage, or at least 90% of nominal voltage), the first current limit may become ineffective because the voltage is held equal to the target by the voltage controller. However the reactive current limit controller may continue to act when the hard current limit is reached regardless of the converter voltage.

Features and advantages according to embodiments of the present invention may include the following or may provide the following advantages:

Regarding Limitation of active power and frequency:

1) The limitation of the converter power reference at the level of the prime-mover available power which subsequently may force the frequency into its limit and may freeze the black start voltage ramp, as per 2).

As Advantages the converter controller will respect the limitation of the prime-mover (wind) available power while performing a black start voltage ramp or operating in island mode.

2) When the frequency limit is reached, the black start voltage ramp is frozen and a trim controller is used to change the electrical system voltage to modulate the load placed on the converter to allow the frequency to track the limit.

As advantages the converter controller can be relied upon to autonomously increase the electrical system voltage, until the prescribed frequency limit is reached and it can then be relied upon to prevent the frequency from exceeding the limit.

3) The addition of the (unfiltered or filtered) power feedback with the output of the frequency to power droop to keep the frequency close to the nominal value until the available power limit is reached may have advantages in that large frequency deviations are not experienced during the black start voltage ramp unless the available power limit is reached, giving the process a cleaner action.

Regarding Limitation of reactive power/overall output current:

4) The freeze of the black start voltage ramp to respect the current limit, whilst allowing some current headroom to balance reactive current load.

5) The use of a reactive current limit controller to ensure that the current output of the converter does not exceed a hard limit by ensuring the converter output voltage tracks the electrical system voltage within a sufficient margin.

Wind turbine's power converters may perform a distributed black start of all or part of a wind farm electrical system using one or more WTGs for the energization, and then maintain the stability of the voltage and frequency whilst respecting available power, frequency and current limits. In addition, these embodiments may allow a wind farm to energise a wider portion of a national electricity grid and therefore contribute to the black start of the whole grid following a de-energisation.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling a utility grid side converter portion of at least one converter of at least one wind turbine being connected via a generator side converter portion to a generator of the wind turbine, the utility grid side converter portion being connectable to a wind park grid of a wind park during black start of the wind park, the method comprising:
ramping up a converter voltage reference defining a desired output voltage of the utility grid side converter portion to the wind park grid unless a power related condition including a limit of the amount of active power the converter can provide and/or a wind park grid frequency related condition including a maximum allowable frequency deviation from a target wind park grid frequency or a converter current related condition including a converter current limit is violated.

2. The method according to claim 1, further comprising:
measuring a wind park grid voltage;
wherein ramping up the converter voltage reference comprises:
supplying to the converter as a converter voltage reference a sum of the wind park grid voltage and a positive increment;
increasing a converter power reference when a wind park grid frequency falls below a target wind park grid frequency; and
continuing increasing the converter voltage reference up to a target value of the wind park grid voltage unless:
the converter power reference is greater than an available converter power and/or
a, in particular absolute value of, converter current is greater than the converter current limit.

3. The method according to claim 2, wherein the available converter power is based on an available power of a generator driven by a rotation shaft at which plural rotor blades are connected.

4. The method according to claim 2, further comprising:
if the converter power reference is greater than the available converter power:
discontinuing further increasing the converter voltage reference; and
using trim control to hold the wind park grid frequency at a wind park grid frequency limit.

5. The method according to claim 1, wherein using trim control comprises:
changing, in particular decreasing, the converter voltage reference depending on a frequency difference between the wind park grid frequency and the wind park grid frequency limit, in order to prevent the wind park grid frequency from further decreasing, in particular in order to hold the wind park grid frequency close the wind park grid frequency limit.

6. The method according to claim 2, further comprising:
if the converter current is greater than the converter current limit:
discontinuing further increasing the converter voltage reference; and
using reactive current limit control to hold the converter current at the converter current limit.

7. The method according to claim 6, wherein using reactive current limit control comprises:
changing a converter modulation voltage limit depending on a difference between the reactive converter current limit and the reactive converter current, in particular in order to keep the converter current at the converter current limit.

8. The method according to claim 7, wherein the reactive current limit control selects whether to limit an upper or a lower converter modulation voltage limit depending on whether the reactive converter current is inductive or capacitive.

9. The method according to claim 8, wherein the wind park frequency limit is given as a difference between a target frequency and a maximal frequency deviation.

10. A method of controlling plural converters of plural wind turbines connectable to a wind park grid of a wind park during black start of the wind park, the method comprising:
performing, for each of the plural converters independently, the method according to claim 1.

11. An arrangement for controlling at least one converter of at least one wind turbine connectable to a wind park grid of a wind park during black start of the wind park, comprising controller portions being adapted to control or carry out the method according to claim 1.

12. The arrangement according to claim 11, comprising:
an available active power clamp, adapted to ensure that the converter power reference is restricted by the available power.

13. The arrangement according to claim 11, comprising:
a trim controller, adapted to control the wind park grid frequency to the wind park grid frequency limit, by changing the converter reference voltage.

14. An arrangement according to claim 11, comprising:
a reactive current limit controller, adapted to control the converter reactive current to the converter current limit, by regulating the converter modulation voltage.

15. A wind park comprising plural wind turbines connected within a wind park grid, wherein at least one wind turbine comprises the arrangement according to claim 11.

* * * * *